April 7, 1931. J C NELSON ET AL Re. 18,036

COMBINED CLOTHES WASHER AND DRIER

Original Filed May 7, 1925 5 Sheets-Sheet 1

Witness
X. L. Marde.

Inventor
J. C. Nelson +
By P. E. Geldhof
Denison Thompson
Attorneys

April 7, 1931. J. C. NELSON ET AL Re. 18,036
COMBINED CLOTHES WASHER AND DRIER
Original Filed May 7, 1925 5 Sheets-Sheet 2
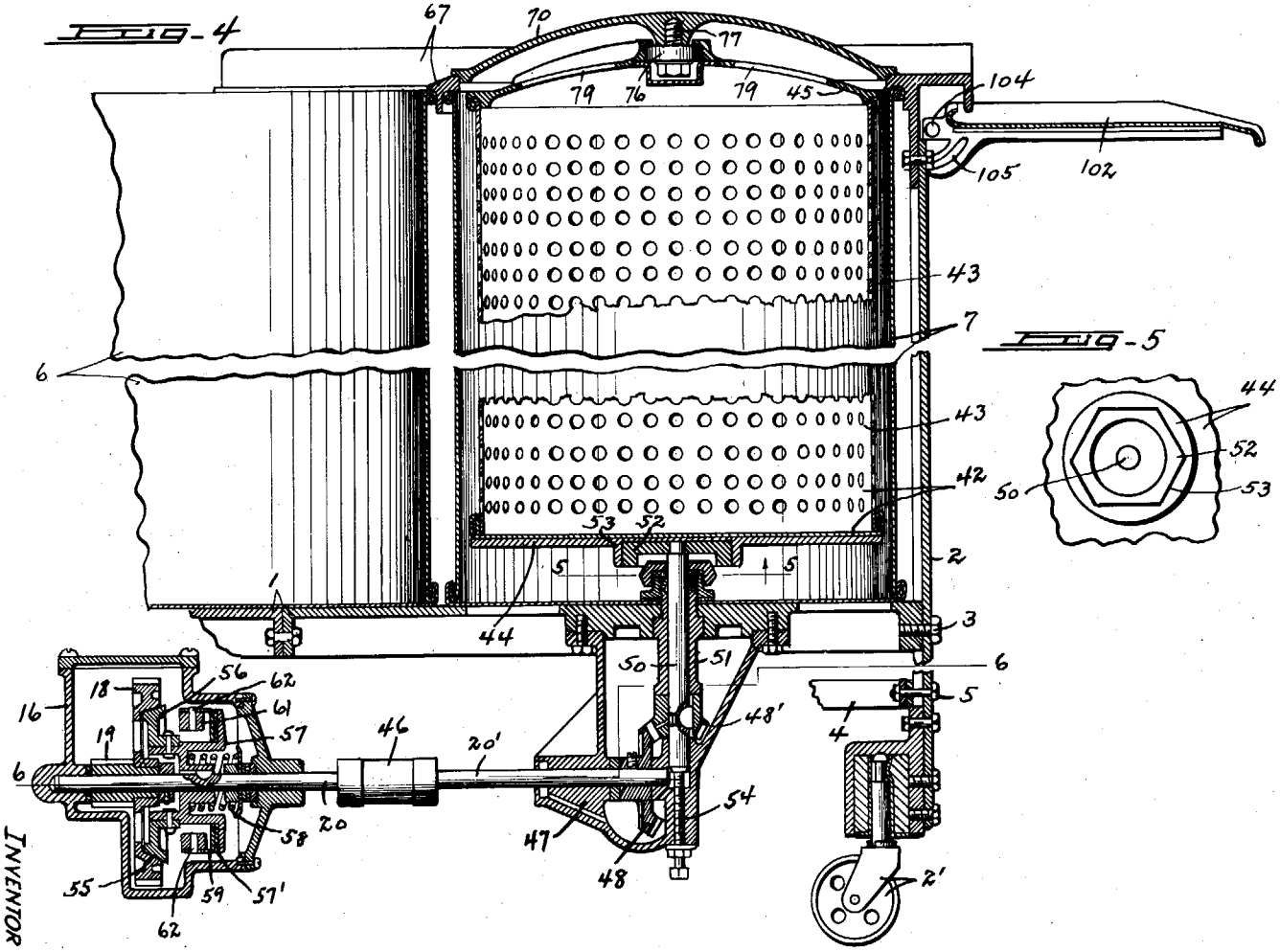
WITNESS
H. L. Meade
INVENTOR
By J. C. Nelson &
P. E. Geldhof
Denison & Thompson
ATTORNEYS April 7, 1931. J. C. NELSON ET AL Re. 18,036

COMBINED CLOTHES WASHER AND DRIER

Original Filed May 7, 1925 5 Sheets-Sheet 3

WITNESS
H. L. Meade.

INVENTOR
By J. C. Nelson &
P. E. Geldhof
Jenson & Thompson
ATTORNEYS

April 7, 1931. J. C. NELSON ET AL Re. 18,036

COMBINED CLOTHES WASHER AND DRIER

Original Filed May 7, 1925 5 Sheets-Sheet 4

WITNESS
H. L. Meade.

INVENTOR
J. C. Nelson +
BY P. E. Gelahoz
Denison & Thompson
ATTORNEYS

April 7, 1931. J. C. NELSON ET AL Re. 18,036

COMBINED CLOTHES WASHER AND DRIER

Original Filed May 7, 1925 5 Sheets-Sheet 5

WITNESS
H. L. Meade.

INVENTOR
By J. C. Nelson +
P. E. Selahoj
Denison + Thompson
ATTORNEYS

Reissued Apr. 7, 1931

Re. 18,036

UNITED STATES PATENT OFFICE

JABEZ C. NELSON AND PETER E. GELDHOF, OF SYRACUSE, NEW YORK, ASSIGNORS TO SYRACUSE WASHING MACHINE CORPORATION, OF SYRACUSE, NEW YORK, A CORPORATION OF DELAWARE

COMBINED CLOTHES WASHER AND DRIER

Original No. 1,720,851, dated July 16, 1929, Serial No. 28,564, filed May 7, 1925. Application for reissue filed May 1, 1930. Serial No. 449,052.

This invention relates to a combined clothes washer and centrifugal drier involving the use of juxtaposed upright containers mounted upon a single supporting frame and containing the washing and drying mechanisms respectively adapted to be driven from the same source of power which is mounted upon the frame preferably in a plane directly beneath the containers.

The main object is to provide a compact washer and drier of the type as a unitary article of manufacture in which both of the mechanisms may be operated simultaneously or separately from the same source of power so that one batch of clothes may be operated upon by the washing mechanism while a previously washed batch may be operated upon by the centrifugal drier thereby greatly increasing the output without extra work and permitting the clothes to be more conveniently and directly transferred from one mechanism to the other without material loss of time or labor.

Another object is to reduce to a minimum the vibration of the machine incidental to the operation of the centrifugal drier particularly when rotated at the necessary high speed.

Another object is to provide means whereby the washing fluid may be transferred from either container to the other or discharged entirely from the machine as may be required in the various steps of the washing and drying process.

A further object is to provide simple and efficient means whereby the rotary element of the centrifugal drier either with or without the clothes therein, may be removed by upward axial displacement or replaced by reverse movement and automatically locked to its drying element.

Other objects and uses relating to specific parts of the device will be brought out in the following description.

In the drawings:—

Figure 4 is an enlarged vertical sectional view partly broken away taken on line 4—4, Figure 1, the laundry tray being omitted.

Figure 5 is an enlarged detail sectional view taken in the plane of line 5—5, Figure 4.

Figure 6:
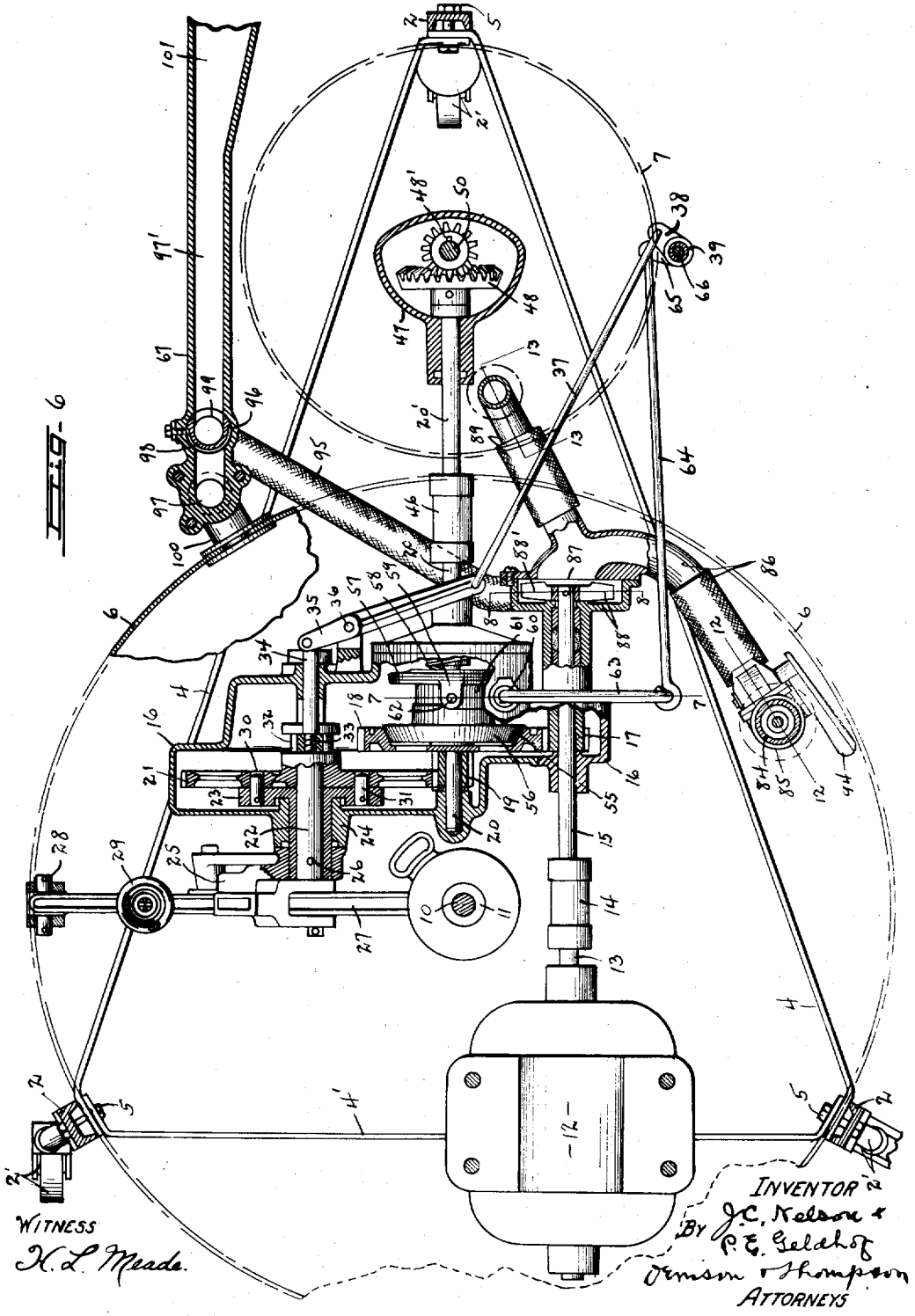
Figure 6 is a horizontal sectional view taken in the plane of line 6—6, Figure 4, mainly in a plane below the containers for the washing and drying mechanisms but showing in addition the full tripod construction of the frame, the motor and the conduits for the circulation of the washing fluid from one container to the other and, the discharge nozzle leading to the exterior of the machine.
Figure 7:
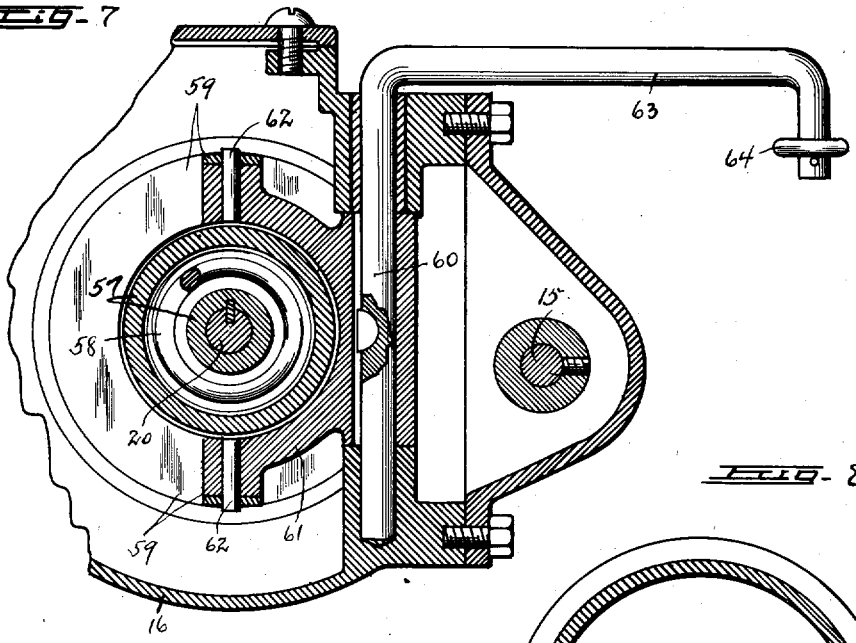
Figure 7 is an enlarged vertical sectional view taken in the plane of line 7—7, Figure 6.
Figure 12:
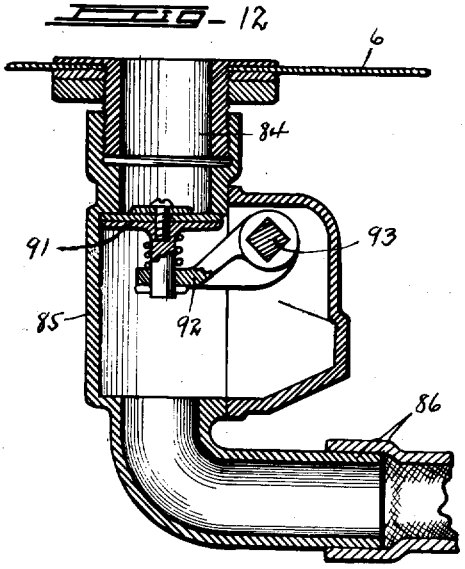
Figure 13:
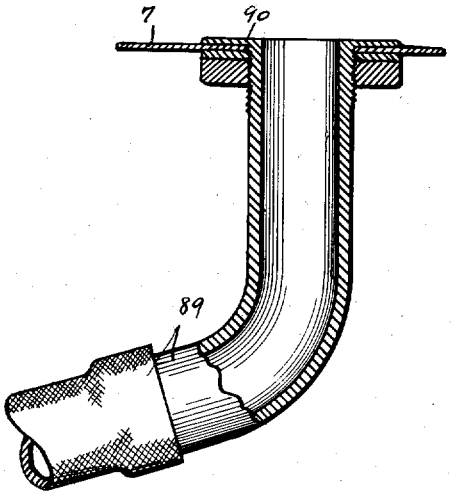

Figures 12 and 13 are enlarged detail sectional views taken respectively in the planes of lines 12—12 and 13—13, Figure 6.

As illustrated, this machine comprises a main supporting frame of the tripod type having a substantially horizontal platform 1 carried by a plurality of, in this instance, three legs 2 which are arranged at the angles of an isosceles triangle and in addition to being secured to the platform 1 by bolts 3 are also connected to each other some distance below the platform by braces 4 and 4′ extending along the sides of the triangle and having their ends secured to the legs by bolts 5.

The lower ends of the legs are provided with castors 2′ adapted to rest upon the floor to permit the machine as a whole to be moved from place to place along the floor as may be more convenient for the operator as, for example, when using the machines in connection with stationary laundry trays in a manner hereinafter described.

The platform 1 is of sufficient horizontal area within its marginal edge to receive and support a relatively large circular washing vat or tub 6 and a relatively small circular drier vat or tub 7 side by side in fixed relation to each other with the larger vat nearest the base of the triangle and the smaller vat nearer the apex of the triangle and the axes of both vats in a vertical plane bi-secting the angle at the apex of the triangle and thereby passing through the base of the triangle midway between the adjacent angles.

The vertical axes of the vats 6 and 7 are wholly within the triangle so that the angles at the base of the triangle will lie in vertical planes substantially co-incident with the adjacent sides of the vat 6 and at equal distances from the axis thereof while the angle at the apex of the triangle will be in a vertical plane substantially coincident with the corresponding side of the periphery of the vat 7 and therefore the legs 2 which are secured to the angles of the triangular bracing frame may be substantially straight vertically and secured to the adjacent portions of the peripheries of the vats 6 and 7 and also to the adjacent portions of the perimeter of the platform 1 which follows closely the circular outlines of both vats.

The object of this triangular supporting and bracing means for the combined washer and drier is to bring all of the mechanism to be brought into a unitary structure supported on the floor at three bearing points for stabilizing purposes and also to reduce to a minimum any vibration incidental to the joint or independent operation of both the washing and drying mechanism or either of said mechanisms separately as will be hereinafter more fully explained, it being understood that the platform 1 serves as a rigid tie connection between the two vats 6 and 7 to hold them against relative movement and in differentiating the drying mechanism from the washing mechanism it will be observed that the distinction is only nominal, the "washing mechanism" being employed to loosen the dirt and other foreign matter from the clothes by alternate pressure and suction while the centrifugal "drying mechanism" serves the double purpose of freeing the dirt and other foreign matter in solution from the clothes and also for drying the clothes so that the latter may reasonably be termed a supplemental washer as well as a drier.

*Washing mechanism*

In addition to the vat 6 the washing mechanism comprises a plurality of, in this instance, two inverted cup shaped dashers or cups 8 operatively connected to a yoke 9 which in turn is adjustably mounted on a vertically mounted plunger 10, the latter being reciprocally movable in a suitable gland 11 in the bottom of the vat 6 coaxial therewith while the cups 8 are mounted upon the yoke 9 at one side of said axis for engagement with the clothes and washing fluid in the vat as the plunger and cups are reciprocated vertically.

Any suitable means may be employed for imparting vertical reciprocatory motion and also rotary motion to the upright shaft or plunger 10, said means being partially shown in the drawings as consisting of an electric motor 12 secured to the underside of the platform 1 and having its armature shaft 13 connected by a universal joint 14 to a coaxial shaft 15 which is journaled in a suitable gear case 16 on the underside of the platform 1, said shafts 13 and 15 being located at one side of the axis of the vat 6 and parallel with a direct line between the axes of both of the vats 6 and 7.

A pinion 17 is secured to the driving shaft 15 within the gear case 16 and meshes with a gear 18 which is secured to the hub of a second pinion 19, the latter being loosely mounted upon a counter shaft 20 so as to permit the gear and pinion to rotate relatively to said shaft for a purpose presently described.

The pinion 19 meshes with a relatively large gear 21 which is loosely mounted upon a crankshaft 22 for relative rotary movement and also has an independent axial movement into and out of clutching engagement with a clutch member 23 having an elongated hub journaled in a bearing 24 in the adjacent end of the gear case 16 and carrying at its outer end a crank arm 25.

The hub of the clutch member 23 together with the crank arm 25 are keyed to each other and to the shaft 22 by means of a key or pin 26, Figure 6, to cause those parts to rotate in unison.

The crank arm 25 is operatively connected in any well known manner to the intermediate portion of a rock arm or lever 27 extending radially to and at one side of the axis of the vat 6 below the platform 1 and having one end pivotally connected at 28 to the outer edge of the platform and its inner end suitably connected to the lower end of the plunger 10 whereby as the shaft 22 with the crank arm 25 thereon is rotated through the medium of the gear train and clutch previously described rocking motion will be imparted to the rock arm or lever 27 for reciprocating the pluger 10 and thereby effecting a corresponding reciprocatory movement of the yoke 9 and cups 8 carried thereby.

A coiled spring 29 may be connected in any well known manner to the lever 27 and to the frame of the machine for retracting the inner end of the lever and parts carried thereby upwardly and thereby assisting the motor in lifting those parts.

The counter shaft 20 is located between the axes of the vats 6 and 7 and approximately in a direct line between said axes while the driving shaft 15 and crank shaft 22 are located at opposite sides of and parallel with the counter shaft 20 and therefore at opposite sides of the vertical axis of the vat 6 and plunger 10 while the motor 12 and gear case 16 containing the gear train connections between the driving shaft 15 and lever 27 are also located at opposite sides of the lever 27 and plunger 10 so that the load incidental to the operation of the cups 8 for washing purposes is nearly in the center of the power plant on the underside of the platform 1 for the purpose of distributing the power transmitting mechanism more evenly around the plunger and thereby introducing a more effective balance and consequent reduction of vibration in the operation of the washing mechanism.

As previously stated the clutch gear 21 is movable axially into and out of clutching engagement with the clutch member 23 and for this purpose is provided with apertures —30— adapted to receive studs —31 on the member 23 when the two parts are brought together for transmitting motion from the pinion 19 to the crank shaft 22.

The hub of the clutch gear 21 is provided with an annular groove 32 for receiving a shifting member 33 which is connected to one end of a shifting rod 34, Figure 6, said split rod being mounted in a suitable bearing in the adjacent side of the gear case 16 and having its outer end connected to one end of a shifting lever 35.

Figure 2:
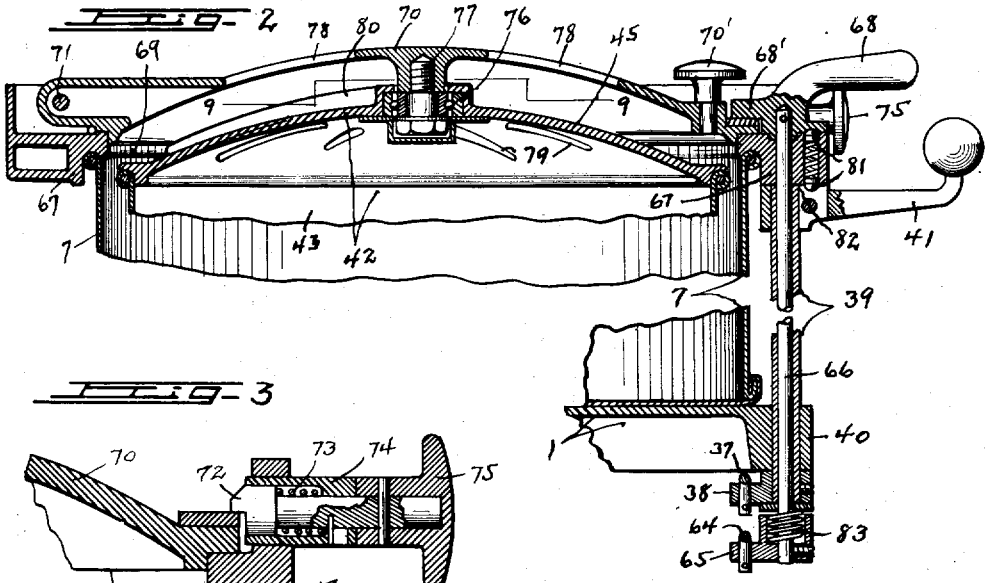
Figure 2 is an enlarged transverse vertical sectional view, partly broken away, taken on line 2—2, Figure 1.

This lever 35 is pivoted at 36 to the gear case 16 and has its other end connected by a link 37 to a crank arm 38 on the lower end of an upright tubular shaft 39, Figure 2.

The tubular upright shaft 39 extends upwardly along the outside of and in close proximity to the vat 7 and has its lower end journaled in a suitable gearing 40 on the platform 1 and its upper end provided with a hand lever 41 secured thereto for rocking said shaft about its axis and thereby transmitting axial motion to the clutch gear 21 through the medium of the link 37, lever 35 and shifting rod 34 for engaging and disengaging said gear clutch with the clutch member 23.

It is now evident that while the motor 12 is in operation positive motion will be transmitted to the gear clutch 21 and that if the hand lever 41 is shifted in one direction the clutch gear 21 will be forced into engagement for operating the crank shaft 22 and thereby reciprocating the plunger 10 with the cups 8 thereon for washing purposes while on the other hand if the hand lever 41 is shifted in the opposite direction the clutch gear 21 will be withdrawn from engagement with the member 23 to be operated independently thereof to stop the reciprocation of the plunger and parts carried thereby.

*Centrifugal drier*

An upright cylindrical cage 42 is rotatably mounted within the vat 7 coaxial therewith but clear from the walls thereof to avoid friction therewith and comprises a perforated bell 43 having its lower end secured to a circular supporting plate or bottom 44 and its upper end provided with a concavo-convex cap or lid 45 removably mounted thereon but frictionally engaged therewith to be rotated thereby in a manner hereinafter described.

The counter shaft 20 is connected by a universal joint 46 to an axial extension shaft 20′ which is journaled in one side of a gear case 47 and is operatively connected by a beveled gear 48 and pinion 48′ to an upright shaft 50 which is journaled in a suitable gland 51 in the platform 1 coaxial with the axis of the cage 42 and has its opposite end provided with a hexagonal or other angular head 52 engaging in a similarly formed angular recess 53 in the bottom plate 44 for transmitting rotary motion from said upright shaft 50 to the cage 42 and permitting said cage to be removed from the head 52 by upward displacement when desired.

The gear case 47 is secured to the underside of the platform 1 as shown in Figure 4 and is provided in its lower side with an adjustable end thrust bearing screw 54 for the lower end of the upright shaft 50 and thereby to hold the rotary head 52 out of frictional engagement with the upper end of the gland 51 which is preferably of the stuffing box type to prevent leakage of water from the bottom of the vat 7 through the gland.

Suitable means is provided for controlling the operation of the centrifugal drier mechanism independently of the washing mechanism while the motor is in operation and as previously stated the gear 18 which is driven continuously by the motor through the medium of the pinion 17 is loosely mounted upon the shaft 20 to rotate independently thereof and is provided with a conical clutch face 55 adapted to be engaged by a conical clutch member 56 on one end of a brake drum 57 which is splined on the shaft 20 for axial movement and is spring-pressed in one direction by a coiled spring 58 for frictionally engaging the clutch member 56 with the clutch gear 18 for transmitting motion to said shaft 20 and thence through the shaft 20′ and gears 48 and 48′ to the upright shaft 50 for rotating the cage 42, the clutch member 56 being riveted or otherwise secured to the hub of the brake drum 57 as shown in Figure 4.

The brake drum 57 is provided with an outwardly projecting annular flange having a friction washer 57′ of fibre or equivalent material adapted to be engaged by a brake shoe 59 constituting a part of the clutch shifting means.

An upright rock shaft is journaled in suitable bearings in the gear case 16, Figure 6, and has its lower end provided with a crank arm 61 pivotally connected at 62 to the brake ring 59 and its upper end provided with a crank arm 63 connected by a link 64 to a crank arm 65 on the lower end of an upright rock shaft 66 which extends vertically through the tubular shaft 39 coaxial therewith and has its upper end journaled in the adjacent side of frame 67 and is provided with a hand lever 68 by which it may be turned for shifting the clutch member 56 into and out of clutching engagement with the clutch gear 18 and also for moving the brake ring 59 into and out of engagement with the friction face 57′ of the brake drum 57.

The frame 67 embraces a portion of the periphery of the upper end of the washing vat 6 and may be rigidly secured thereto by brazing or other suitable fastening means and extends entirely around the upper end of the drier vat 7 to which it may be also rigidly secured by brazing or otherwise to form a rigid tie between the upper ends of both vats for holding them in fixed relation, said frame being provided with a central cylindrical opening 69 of sufficiently large diameter to permit the cage 42 to be withdrawn therethrough by upward displacement when desired or replaced by downward displacement into interlocking engagement with the driving head 52.

Figure 3:
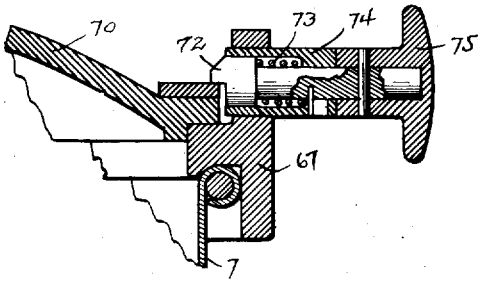
Figure 3 is an enlarged detail sectional view taken on line 3—3, Figure 1.

A lid or cover 70 for the opening 69 is hinged at one side at 71 to the frame 67 at a point beyond the adjacent side of the vat 7 and when closed is adapted to engage the upper inner faces of the walls of the opening 69 to form a substantially water-tight joint therewith or it is held in place by a locking bolt 72 and spring 73, both guided in a bushing 74 in the adjacent side of the frame 67, the outer end of the bolt being provided with a handle 75 by which it may be withdrawn from its locking position against the action of its retracting spring 73, Figure 3.

The lid 70 is also concavo-convex in cross section and is provided at the side nearest the locking bolt 72 with a handle 70′ by which it may be opened and closed.

The lever 68 which controls the operation of the centrifugal drier cage 42 is provided with an extension 68′ movable into and out of engagement with the upper face of the adjacent side of the lid 70 for locking said lid in its closed position when the lever 68 is adjusted to cause the rotation of the cage 42 and to release said lid when the lever is adjusted to stop the operation of the cage, but the lid 70 cannot be raised until it is further unlocked by the withdrawal of the bolt 72 thereby reducing the liability of opening the lid while the cage with the clothes therein is being rotated, it being understood that when the lever 68 is adjusted to stop the rotation of the cage it will be necessary to withdraw the bolt 72 to release the lid 70 and permit it to be opened.

The cap 45 covering the upper open end of the cage 42 is centrally journaled by anti-friction bearings 76 upon a suitable supporting stud 77 on the underside of the lid 70 so that when frictionally engaged with the upper end of the cage it will rotate freely therewith and will also serve to hold the cage against excessive vibration in case the clothes therein should be slightly heavier on one side than on the other while the cage is being rotated at high speed.

The upright perforated walls of the cage 42 are arranged in sufficiently spaced relation to the inclosing walls of the vat 7 to permit the washing or rinsing fluid to be thrown by centrifugal force from the clothes through the perforated side walls of the cage and into the surrounding portions of the vat as the cage is rotated, the gear ratio of the driving mechanism for the cage being such as to rotate said cage at a sufficiently high speed to expel practically all of the moisture from the clothes by centrifugal force so that after a comparatively brief period of operation the clothes are practically dry and more or less fluffy ready for smoothing by a suitable ironing mechanism.

Suitable means is also provided for assisting this centrifugal drying of the clothes during the rotation of the cage and for this purpose the lid 70 is provided with a circumferential series of openings 78 while the cover plate 45 for the cage 42 is also provided with openings 79 therethrough and a circumferential series of vanes or ribs 80 extending outwardly from the center thereof and preferably on the upper face of the cover 45 and arranged so as to create circulation of air from the top downwardly through the openings 78 and 79 and thence through the clothes in the revolving cage and out through the perforations in the side walls of said cage into the outer container from which it is drawn into and through the pump, it being understood that during such rotation the clothes are thrown with considerable force from the center and against the perforated walls of the cage leaving more or less air space in and around the axis of the cage and permitting circulation of air therethrough leaving the clothes in a substantially dry fluffy condition.

It will be observed upon reference to Figure 4 that the brake shoe 59 operates directly against the brake surface 57′ of the brake drum 57 to disengage the clutch member 56 from the clutch gear 18 against the action of the retracting spring 58 which serves to retract both the clutch member 56 and brake drum 57 under which conditions the application of the brake simultaneously with the withdrawal of the clutch member 56 will retard and stop the rotation of the shafts 20 and 20′ and cage 42 driven thereby, all of which greatly expedites the centrifugal drying operation and enables both the brake and clutch to be controlled by the same lever 68 which is coaxial with and in proximity to the washer controlling lever 41 as shown in Figure 2 thus permitting both levers to be operated from the same side of the machine.

This proximate coaxial operation of the two levers 41 and 68 also permits the use of coaxial detents 81 and an interposed coiled spring 82 arranged with a socket in the adjacent portion of the frame 67 for engaging in recesses in the adjacent faces of the levers 41 and 68 to frictionally hold them in their different positions of adjustment, the shaft 66 and lever 68 carried thereby having slightly vertical movement against the action of a retracting spring 83 between the hubs of the crank arms 38 and 65 to adjust the engagement of the extension 68′ with the upper face of the lid 70 when the latter is closed and also to assist in frictionally holding the shaft 66 and tubular shaft 39 against accidental displacement from their adjusted positions.

*Fluid circulating mechanism*

Figure 8:
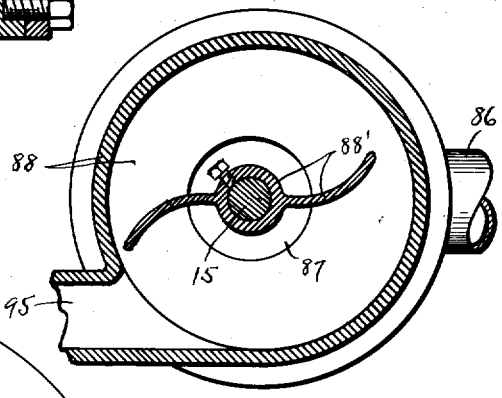
Figure 8 is an enlarged transverse sectional view of the pump taken in the plane of line 8—8, Figure 6.
Figure 9:
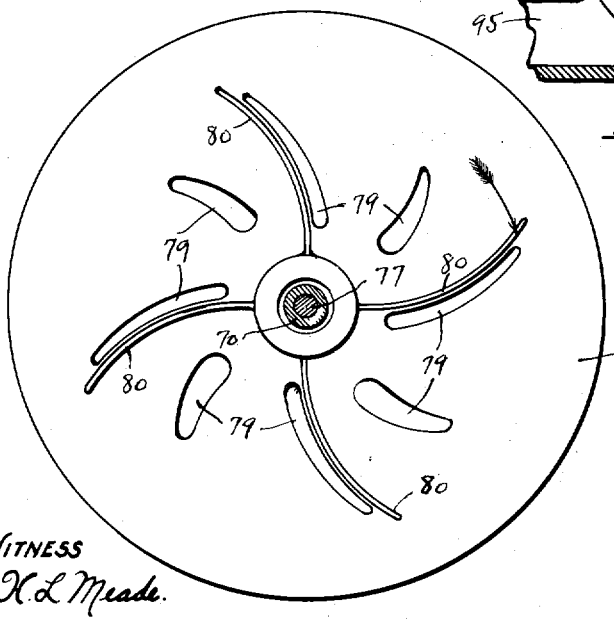
Figure 9 is an enlarged top plan of the cap for the revoluble clothes container of the centrifugal drier.
Figure 10:
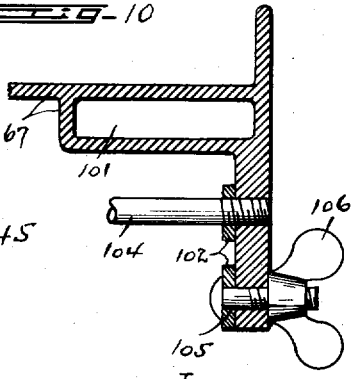
Figure 10 is an enlarged detail sectional view taken on line 10—10, Figure 1.

Suitable means is provided for withdrawing the washing or rinsing fluid from both of the vats 6 and 7 and also for transferring the suds or other fluid from the drier vat to the washing vat and for these purposes the bottom of the washing vat 6 is provided with an outlet nipple 84 to which is connected one end of a valve case 85 having its other end connected by a conduit 86 to the inlet side 87 of a rotary pump 88, the latter having its impeller 88′ mounted directly upon the driven shaft 15, the pump casing forming, in this instance, a part of the gear case 16 as shown more clearly in Figures 6 and 8.

The conduit 86 is connected by a branch 89 to an opening 90 in the bottom of the drier vat 7 to form a liquid tight joint therewith thereby establishing open communication between the interior of the drier vat 7 and inlet 87 of the pump 88, see Figures 6 and 13.

The inlet opening of the valve case 85 is controlled by a valve 91 which is yieldingly mounted upon a crank arm 92 of a rock shaft 93, the latter being journaled in one side of the valve case 85 and provided with an external hand lever 94 by which the valve may be opened and closed at will as may be required to retain or to discharge the water in and from the vat 6.

The outlet side of the pump 8 is connected by a conduit 95 and nipple 95′ to a valve chamber 96 in the frame 67, said valve chamber having branch openings 97 and 97′ lead from opposite sides thereof and controlled by a hollow valve 98 having an external operating member 98′ and a radial opening 99 which may be brought into registration with one or the other of the branch passages 97 or 97′ to vary the direction of flow of water from the valve chamber.

The branch passage 97 is connected by an elbow 100 to an inlet opening in one side of the washing vat 6 near the upper end thereof while the branch passage 97′ is connected to a discharge nozzle 101 adapted to discharge over a water table 102 into a stationary laundry tray A or other receptacle.

Figure 11:
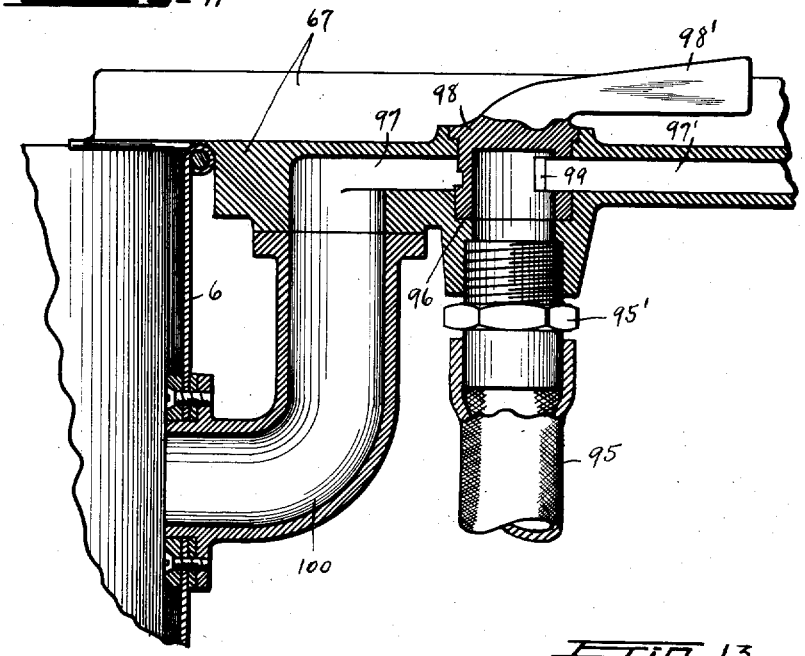
Figure 11 is an enlarged vertical sectional view taken on line 11—11, Figure 1.

In Figures 6 and 11 the valve 98 is adjusted to divert the water from the pump into the nozzle 101 but by turning it one-half turn the opening 99 may be registered with the branch 97 to divert the water from the pump back into the washing vat 6.

Figure 1:
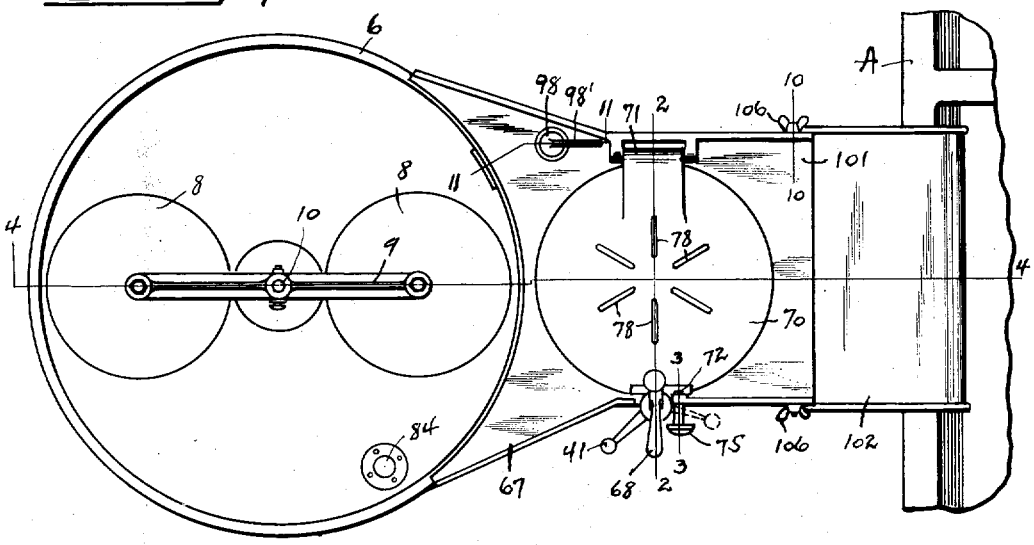
Figure 1 is a top plan of a combined clothes washer and centrifugal drier embodying the various features of the invention except that the cover for the washing vat is removed to show the interior washing mechanism, a portion of a laundry tray being also shown directly under the outer edge of the drain board of the drier.

The drain board 102 extends under the adjacent end of the frame 67 at the side of the vat 7 opposite the vat 6 and is preferably hinged at 104 to said frame and provided with opposite concentric slots 105 for receiving clamping bolts 106, Figure 1, by which the drain board may be tilted to different angles to or from a horizontal plane and locked in any position of adjustment as may be required to direct the water discharged from the nozzle 101 into a suitable receptacle as the vat A.

*Operation*

The clothes to be washed together with a suitable washing fluid forming what may be termed suds, is placed in the vat 6 beneath the cups 8 under which conditions the valve 91 will, of course, be closed to retain the washing fluid in the vat.

The electric motor 12 is then started by the operation of any suitable controlling switch thereby operating the pump 88, gear 18, its pinion 19 and gear 21.

Throwing the clutch gear 21 into engagement with the clutch member 23 will cause the operation of the lever 27 and plunger 10 carrying the cups 8 for washing the clothes in the vat by alternate pressure and suction as the cups are reciprocated vertically into and out of engagement with the clothes.

As soon as the clothes are properly washed in the vat 6 they may be withdrawn therefrom by hand across the frame 67 and into the cage 42 which has been previously opened for such purpose by opening the lid 70 carrying the rotary cover 45.

When a sufficient quantity of the previously washed clothes are placed within the revoluble cage 42 substantially filling the same, the lid 70 with the cover plate 45 thereon is closed and locked in its closed position with the cover plate 45 frictionally engaged with the upper edge of the cage 42 to rotate therewith, it being understood that the lid 70 will then be firmly held against rotary movement.

The lever 68 and its rock shaft 66 are then turned in the proper direction for releasing the brake shoe 59 and simultaneously engaging the clutch 56 with the clutch gear 18 for transmitting rotary motion from said gear to the shaft 20 and thence through the shaft 20′ and upward shaft 50 to the cage 42 which with the wet clothes therein is driven at relatively high speed to expel practically all of the moisture from the clothes through the perforated walls of the cage and into the vat 7.

As previously stated the lower end of the vat is in open communication with the inlet side of the pump 88 through the pipe 89 and owing to the continued operation of the pump 88 the washing fluid accumulating in the vat 7 will be withdrawn therefrom and forced through the pipe 95 into the valve chamber 96 and by adjusting the valve 98 to the position shown in Figures 6 and 11 the washing fluid withdrawn from the vat 7 will be forced outwardly through the passage 97′ and nozzle 101 into one or the other of the laundry trays A or into any other suitable receptacle or waste pipe.

Or, if it is desired to withdraw the washing fluid from the vat 6 it may be accomplished by simply opening the valve 91 and allowing the fluid in the vat to pass through the conduit 86 into the inlet side of the pump 88 from which it will be expelled through the pipe 95 into the valve chamber and thence out through the passage 97′ and nozzle 101.

On the other hand, assuming that it is desired to return the suds water accumulating in the vat 7 and that the valve 91 is closed, the valve 98 may be reversed to cut off communication between the conduit 95 and branch 97′ and to open communication between said conduit and the branch 97 thus permitting the water to be thrown directly from the drying vat 7 and discharged into the upper portion of the washing vat 6 thus permitting the re-use of the same suds as long as may be desired without varying the amount of water in the washing vat and at the same time maintaining a continuous withdrawal of the fluid from the clothes in the drying vat.

It will be evident from the foregoing description that as soon as the previously washed clothes have been transferred from the washing vat 6 to the drier cage 42 and during the centrifugal drying operation an additional batch of soiled clothes may be placed in the washing vat and operated upon by the washing mechanism without disturbing the operation of the drier cage, all of which greatly increases the output of the machine and insures a complete washing and drying of the clothes with the expenditure of a minimum amount of labor and expense and without liability of injuring the finest of fabrics or mutilation of any parts thereof and at the same time permitting either mechanism to be operated independently of the other or simultaneously as may be required.

What we claim is:

1. In a device of the class described, a vat having a cover, a clothes receptacle rotatable within the vat, a lid journaled on the cover to center the receptacle and rotate with the receptacle relatively to the vat, a shaft operatively connected to the bottom of the receptacle, and means for rotating the shaft whereby the receptacle is rotated.

2. In an apparatus of the class described, a vat, a clothes receptacle rotatably mounted in the vat, a cover for the vat, a cover for the clothes receptacle rotatably carried by the cover for the vat and adapted to contact with and center the upper end of the receptacle, and means independent of the cover for the receptacle for positively rotating the receptacle.

3. In an apparatus of the class described, a vat, a clothes receptacle rotatably mounted in the vat, a cover for the vat, a cover for the clothes receptacle adapted to contact with the upper end of the receptacle, means independent of the cover of the receptacle for positively rotating the receptacle, and means supporting the cover of the receptacle permitting its free rotation in contact with the upper end of the receptacle.

4. In an apparatus of the class described, a vat, a clothes receptacle rotatably mounted in the vat, a cover for the vat, a cover for the clothes receptacle adapted to contact with the upper end of the receptacle, means supporting the cover of the receptacle permitting its free rotation in contact with the upper end of the receptacle, and additional means connected to the lower end of the receptacle for positively rotating the receptacle.

5. In a washing machine, in combination, a centrifugal extractor including a casing, a perforated basket rotatably mounted in said casing, a driving element for said basket, a rotatable closure for said basket, a movable support with which said closure has a rotatable connection, said support and closure when the latter is in closed position having predetermined positions, and means for adjusting said driving element whereby to adjust the position of said basket in its relation to said closure.

6. In a washing machine, in combination, a centrifugal extractor including a cylindrical casing, a head frame having an opening into said casing, a perforated basket rotatably mounted in said casing, a driving element for said basket, a cover plate hingedly connected to said head frame and adapted to close the opening therein, means to lock said plate in closed position, a closure for said basket rotatably connected with said plate and movable to open and closed positions therewith, said plate and closure when the latter is in closed position having predetermined positions, and means for adjusting said driving element whereby to adjust the position of said basket in its relation to said closure.

7. In a washing machine, in combination, a centrifugal extractor including a casing having a discharge outlet in its lower portion, a head frame provided for the extractor with a liquid conduit having different discharge outlets, valve means in said conduit adapted to control the direction of flow of liquid into and from said conduit, a drain board connected with said extractor and adapted to receive liquid discharged from one of the outlets of said conduit, a perforated basket rotatably mounted in said casing, means to rotate said basket, a pump, a connection between said pump and the discharge outlet of said casing, and elevating means to conduct liquid from said pump to the valved connection of said conduit.

8. In a washing machine, in combination, a centrifugal extractor including a casing having a discharge outlet in its lower portion, a head frame provided with a liquid conduit having different discharge outlets, valve means to control the direction of flow of liquid into and from said conduit, a drain board supported in an inclined position from said head frame and adapted to receive liquid discharged from one of the outlets of said conduit, a perforated basket rotatably mounted in said casing, means to rotate said basket, a pump, a connection between said pump and the discharge outlet of said casing, and a hose connection between said pump and the valve means in said conduit.

9. In a washing machine, in combination, a centrifugal extractor including a casing having a discharge outlet in its lower portion, a head frame having an opening into said casing and provided with a liquid conduit having different discharge outlets, valve means to control the direction of flow of liquid into and from said conduit, a drain board supported in an inclined position from said head frame and adapted to receive liquid discharged from one of the outlets of said conduit, a perforated basket rotatably mounted in said casing, a driving element for said basket, a cover plate hingedly connected to said head frame and adapted to close the opening therein, means to lock said plate in closed position, a closure for said basket rotatably connected with said plate and movable to open and closed positions therewith, said plate and closure, when the latter is in closed position having predetermined positions, means for adjusting said driving element whereby to adjust the position of said basket in its relation to said closure, a pump, a connection between said pump and the discharge outlet of said casing, and elevating means to conduct liquid from said pump to the valved connection of said conduit.

10. In a washing machine, in combination, a centrifugal extractor including a casing having a discharge outlet in its lower portion, a perforated basket removably and rotatably mounted in said casing, means to rotate said basket, a head frame for the extractor having a conduit provided with different discharge outlets, valve means to control the direction of flow of liquid into and from said conduit, a rotatable closure for said basket, a support for said closure hingedly connected with said head frame, means to lock said support when the closure is in engaging relation with said basket, said support and closure having openings therethrough for the introduction of liquid into the extractor, impelling wings on said closure in association with the openings therethrough, a pump, liquid conducting means connecting the discharge outlet of said casing with said pump, and liquid elevating means between said pump and the valved connection of said conduit.

11. In a machine of the class described, in combination, a centrifugal extractor including a casing, a cover for the casing, hinge means securing the cover to one side of the casing, a basket rotatably mounted in said casing, a rotatable closure for said basket, means on the cover rotatably supporting said closure to rotate freely with and center the upper edge of said basket, said cover and the closure carried thereby being tiltable above said hinge to open and close the casing.

12. In a machine of the class described, in combination, a centrifugal extractor including a casing, a cover for the casing, hinge means securing the cover to one side of the casing, a basket rotatably mounted in said casing, a rotatable closure for said basket, means on the cover rotatably supporting said closure to rotate freely with and center the upper edge of said basket, said cover and the closure carried thereby being tiltable above said hinge to open and close the casing, and means for locking the cover in closed position.

13. In a machine of the class described, in combination, a centrifugal extractor including a casing, a cover for the casing, hinge means securing the cover to one side of the casing, a basket rotatably mounted in said casing, a rotatable closure for said basket, means on the cover rotatably supporting said closure to rotate freely with and center the upper edge of said basket, said cover and the closure carried thereby being tiltable above said hinge to open and close the casing, means for locking the cover in closed position, and means preventing the releasing of said locking means during rotation of said basket.

14. In a machine of the class described, in combination, a centrifugal extractor including a casing, a cover for the casing, hinge means securing the cover to one side of the casing, a basket rotatably mounted in said casing, a rotatable closure for said basket, means on the cover rotatably supporting said closure to rotate freely with and center the upper edge of said basket, said cover and the closure carried thereby being tiltable above said hinge to open and close the casing, and means for adjusting said driving element axially whereby to adjust the position of said basket in its relation to said closure.

15. In a machine of the class described, in combination, a centrifugal extractor including a casing, a cover for the casing, hinge means securing the cover to one side of the casing, a basket rotatably mounted in said casing, a rotatable closure for said basket, means on the cover rotatably supporting said closure to rotate freely with and center the upper edge of said basket, said cover and the closure carried thereby being tiltable above said hinge to open and close the casing, means for locking the cover in closed position, and means for adjusting said driving element axially whereby to adjust the position of said basket in its relation to said closure.

16. In a machine of the class described, in combination, a centrifugal extractor including a casing, a cover for the casing, hinge means securing the cover to one side of the casing, a basket rotatably mounted in said casing, a rotatable closure for said basket, means on the cover rotatably supporting said closure to rotate freely with and center the upper edge of said basket, said cover and the closure carried thereby being tiltable above said hinge to open and close the casing, means for locking the cover in closed position, means preventing the releasing of said locking means during rotation of said basket, and means for adjusting said driving element axially whereby to adjust the position of said basket in its relation to said closure.

JABEZ C. NELSON.
PETER E. GELDHOF.